United States Patent [19]
Oguchi et al.

[11] Patent Number: 5,446,720
[45] Date of Patent: Aug. 29, 1995

[54] INFORMATION RECORDING METHOD AND APPARATUS RECORDING TWO OR MORE CHANGES IN TOPOGRAPHICAL AND ELECTRICAL STATES

[75] Inventors: Takahiro Oguchi, Atsugi; Kunihiro Sakai, Isehara; Toshimitsu Kawase, Atsugi; Akihiko Yamano, Yokohama; Ryo Kuroda, Atsugi, all of Japan

[73] Assignee: Canon Kabushiki Kaisha, Tokyo, Japan

[21] Appl. No.: 180,473

[22] Filed: Jan. 12, 1994

Related U.S. Application Data

[63] Continuation of Ser. No. 666,212, Mar. 7, 1991, abandoned.

[30] Foreign Application Priority Data

Mar. 9, 1990 [JP] Japan ................................ 2-056675
Feb. 28, 1991 [JP] Japan ................................ 3-055559

[51] Int. Cl.$^6$ .............................................. G11B 9/00
[52] U.S. Cl. ................................... 369/126; 250/306; 250/307
[58] Field of Search ............... 250/306, 307, 309, 310, 250/304; 369/126, 101, 47; 365/151

[56] References Cited

U.S. PATENT DOCUMENTS

| | | | |
|---|---|---|---|
| 4,575,822 | 3/1986 | Quate | 365/174 |
| 4,631,704 | 12/1986 | Lucas et al. | 365/126 |
| 4,963,464 | 10/1990 | Setami | 369/109 |
| 4,992,659 | 2/1991 | Abraham et al. | 250/306 |
| 5,001,409 | 3/1991 | Hosaka et al. | 250/306 |
| 5,038,322 | 8/1991 | Van Loenen | 369/101 |
| 5,070,492 | 12/1991 | Ogawa et al. | 369/47 |

FOREIGN PATENT DOCUMENTS

| | | |
|---|---|---|
| 345696 | 12/1989 | European Pat. Off. . |
| 0390470 | 10/1990 | European Pat. Off. . |
| 0435645 | 7/1991 | European Pat. Off. . |
| 1439811 | 12/1968 | Germany . |
| 63-153193 | 6/1988 | Japan . |
| 63-161552 | 7/1988 | Japan . |
| 63-161553 | 7/1988 | Japan . |
| 63-271743 | 11/1988 | Japan . |
| 1-107341 | 4/1989 | Japan . |
| 1-133239 | 5/1989 | Japan . |
| 1-151035 | 6/1989 | Japan . |
| 1-151035 | 6/1989 | Japan . |
| 1-154332 | 6/1989 | Japan . |
| 1-154332 | 6/1989 | Japan . |

OTHER PUBLICATIONS

SPIE. Optical Data Storage Topical Meeting, "Read Channel Optical Modeling For a Bump Forming Dye–Polymer Optical Data Storage Medium", Hartman et al., vol. 1078, Jan. 17, 1989, Los Angeles, pp. 308–323.

Binning, et al., "Scanning Tunnelling Microscopy", Helvetica Physics Acta, vol. 55, pp. 726–735 (1982).

*Primary Examiner*—Georgia Y. Epps
*Assistant Examiner*—Muhammad N. Edun
*Attorney, Agent, or Firm*—Fitzpatrick, Cella, Harper & Scinto

[57] ABSTRACT

This specification discloses a method of recording information on a recording medium which has the relative scanning of the recording medium by a probe for information recording, the relative scanning being effected along the surface of the recording medium, the recording medium being capable of forming two or more kinds of state changes relative to the state of non-recording, and a recording process onto the recording medium through the probe effecting the relative scanning, the recording process being carried out by intermittently forming bits on the recording medium, each of the bits being formed with one of the two or more kinds of state changes in conformity with recording information. The specification also discloses a method of reproducing information recorded on a recording medium by such information recording method. The specification further discloses an apparatus for carrying out the information recording method, and an apparatus for carrying out the information reproducing method.

35 Claims, 10 Drawing Sheets

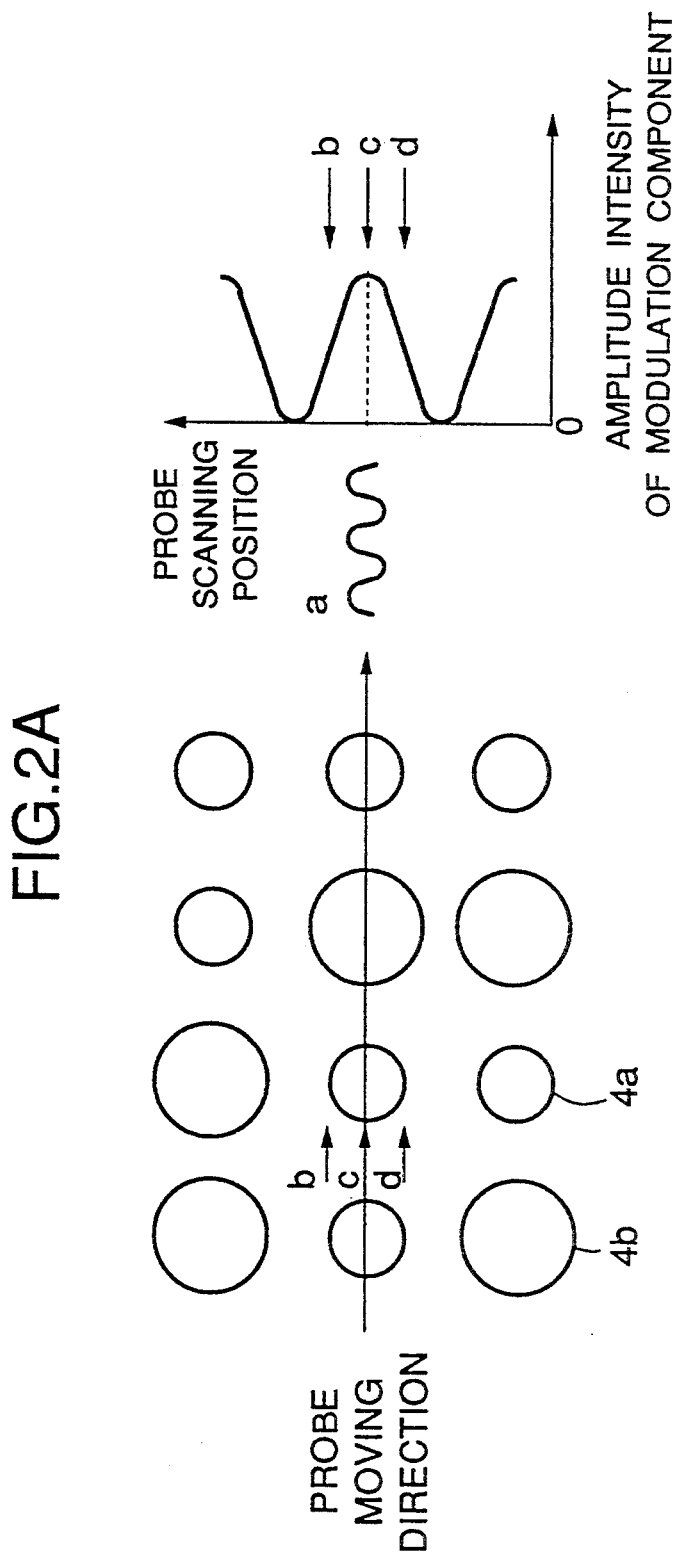

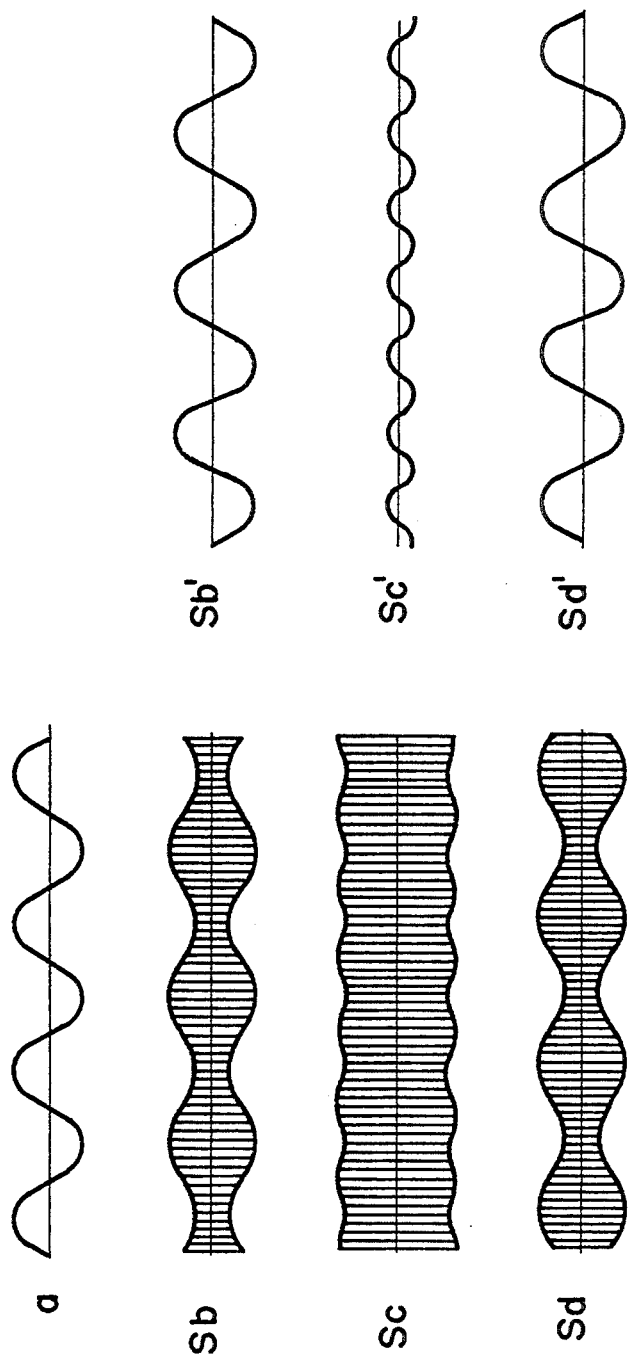

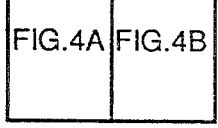
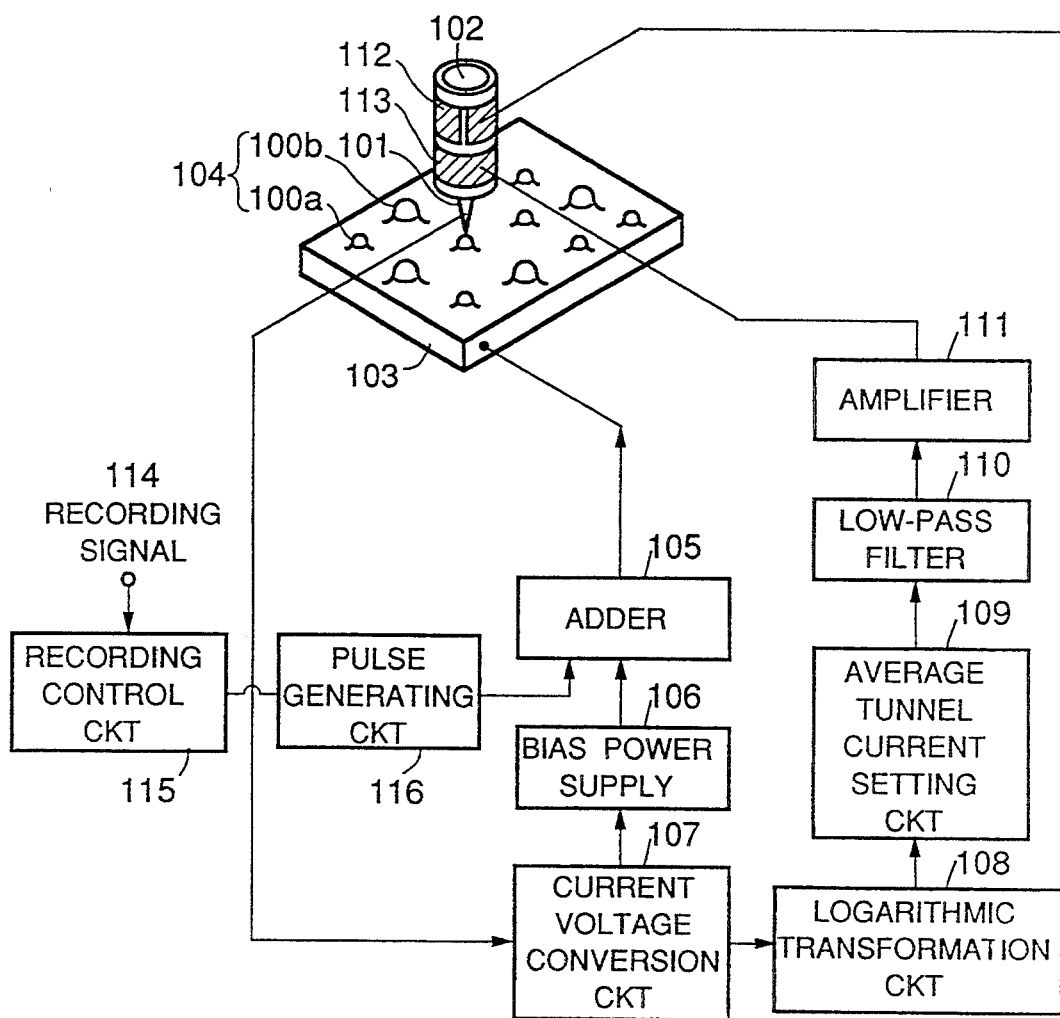

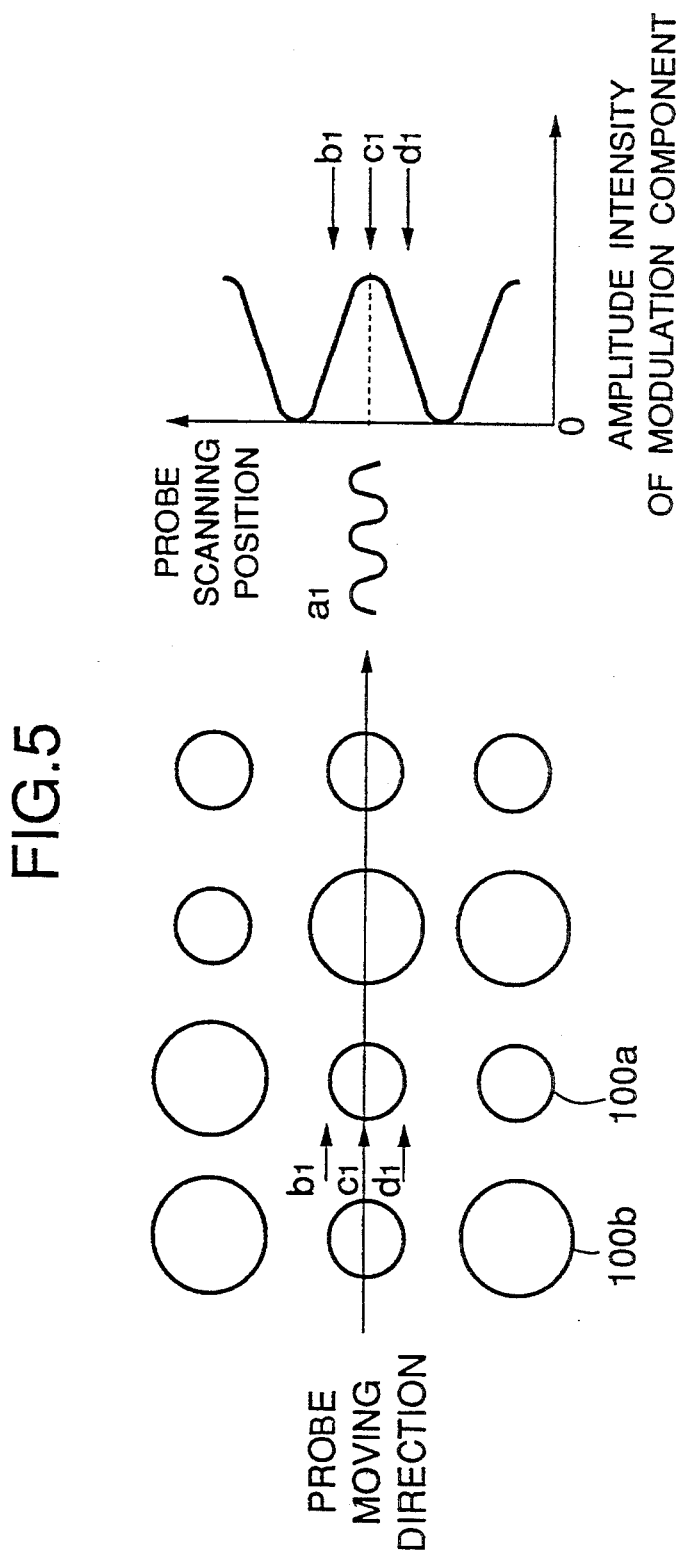

INFORMATION RECORDING METHOD AND APPARATUS RECORDING TWO OR MORE CHANGES IN TOPOGRAPHICAL AND ELECTRICAL STATES

This application is a continuation of application Ser. No. 07/666,212 filed Mar. 7, 1991, which is now abandoned.

BACKGROUND OF THE INVENTION

1. Field of the Invention

This invention is preferably used in information recording-reproducing apparatuses and methods employing, for example, the principle of a scanning type tunnel microscope.

2. Related Background Art

There are known various high-density recording methods, typically, magnetic recording and optical recording. In magnetic recording, the recording wavelength is determined by limitations in a device such as a magnetic head used for recording and reproduction, and in this case, the order of 1 μm is the limit. In optical recording, the recording wavelength is limited by the diameter of a light beam used for recording and reproduction, and the order of 1–0.5 μm is the limit.

On the other hand, in recent years, STM (scanning type tunnel microscope) has been developed and it has become possible to analyze the surface state of a solid at high resolving power, i.e., horizontal resolving power of several Å and vertical resolving power of 1 Å or less [G, Binning et al. Helvetica Physica Acta, 55, 726 (1982)].

Several proposals have been made to use the principle of this STM to record and reproduce variations in unevenness or electron state on the surface of a recording medium at the order of nm (U.S. Pat. No. 4,575,822, Japanese Laid-Open Patent Application No. 63-161552 and Japanese Laid-Open Patent Application No. 63-161553).

There has also been proposed a system in which an ion beam is applied to form by etching grooves for tracking and at the same time, the intensity of the ion beam is modulated in accordance with a recording signal to form depressions and form recording bits and these are reproduced by the use of the principle of STM to thereby accomplish high-density recording and reproduction of about 50 Gbits/cm$^2$ (Japanese Laid-Open Patent Application No. 1-151035).

In such a system, however, it has been difficult to discriminate whether portions of the grooves which are free of depressions are portions which are free of recording bits or recording bits which are not depressions. Accordingly, where bits which are not depressions are continuous, it has been difficult to discriminate the number of bits.

SUMMARY OF THE INVENTION

The present invention has as its primary object to provide information reproduction capable of reproducing data while more reliably confirming the presence of each bit in information recording or reproduction using, for example, the principle of STM, information recording method and apparatus making it possible and a recording medium therefor.

Other objects of the present invention will become apparent from the following detailed description of some embodiments of the invention.

BRIEF DESCRIPTION OF THE DRAWINGS

FIGS. 2A and 2B illustrate signal waveforms in the apparatus of FIG. 1.

FIGS. 4A and 4B are block diagrams showing the construction of a third embodiment of the information recording-reproducing apparatus according to the present invention.

FIG. 5 illustrates the probe scanning position and signal state in the apparatus of FIG. 4.

DETAILED DESCRIPTION OF THE PREFERRED EMBODIMENTS

Some embodiments of the present invention will hereinafter be described with reference to the drawings.

Figure 1:
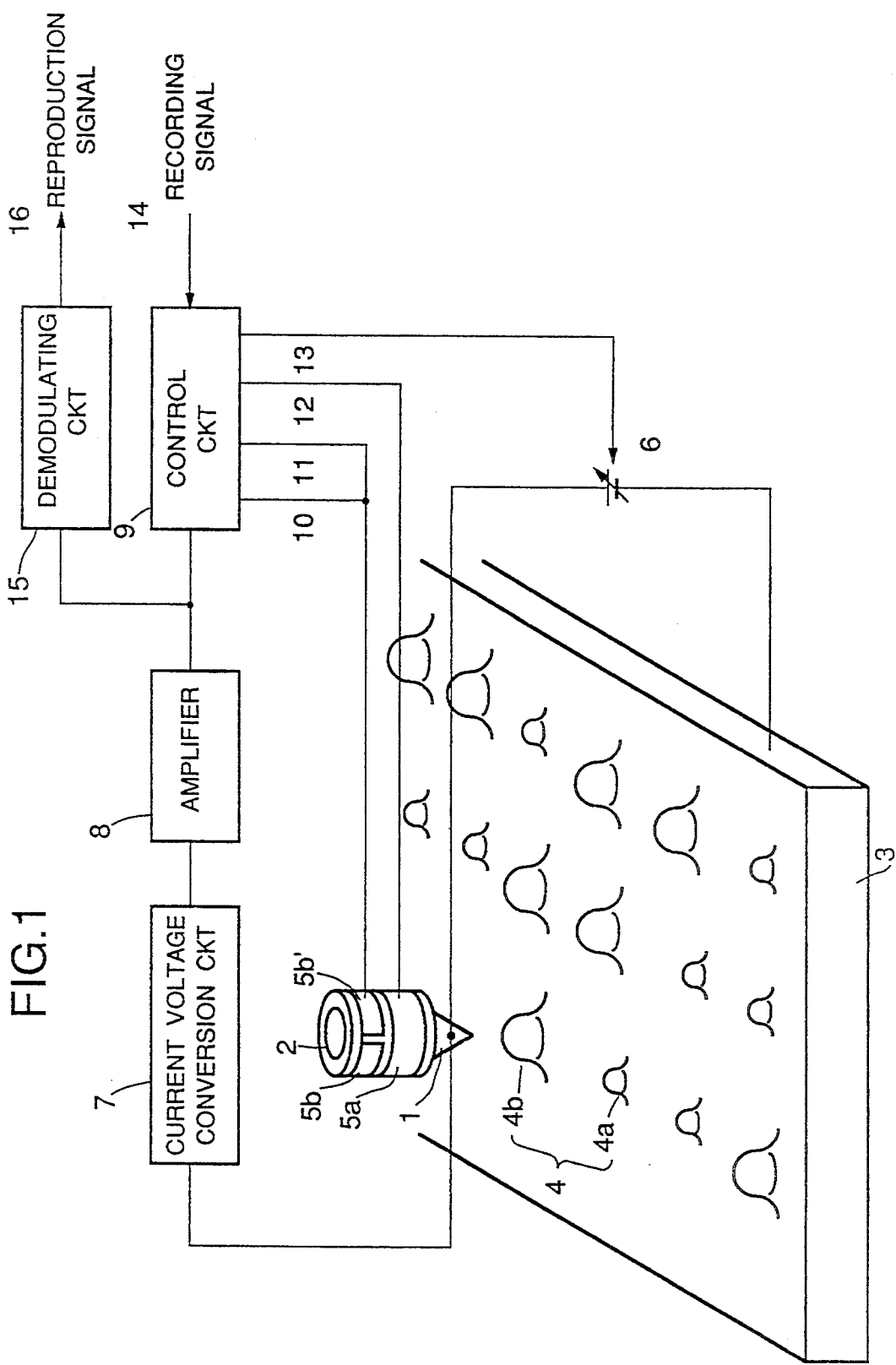
FIG. 1 is a block diagram showing the construction of a first embodiment of an information recording-reproducing apparatus according to the present invention.

FIG. 1 is a block diagram showing the construction of an information recording-reproducing apparatus according to an embodiment of the present invention.

The construction will first be schematically described with reference to FIG. 1.

As shown in the figure, this information recording-reproducing apparatus is provided with a probe 1, a variable voltage source 6 for applying a voltage to between a recording medium 3 and the probe 1, and a control circuit 9 which outputs a power source control signal 13 with an input recording signal 14 taken into account and controls the variable voltage source 6 so that recording bit rows 4 may be successively formed on the recording medium 3 at predetermined timing. Each recording bit row 4 comprises concave or convex (herein convex) tracking bits 4a and information bits 4b. The control circuit 9 also outputs a two-dimensional scanning signal 10 and drives piezo-electric elements 5b and 5b' to thereby vibrate the probe 1 in a direction perpendicular to the tracking direction, and outputs a tracking control signal 11 and drives the piezo-electric elements 5b and 5b' to thereby effect the tracking control of the probe 1 and at the same time, outputs a distance control signal 12 and controls the distance between the recording medium 3 and the probe 1. This information recording-reproducing apparatus is further provided with a current-voltage conversion circuit 7 for converting a tunnel current or an electric field emission current flowing between the probe 1 and the recording medium 3 into a voltage, an amplifier 8 for amplifying the output of the conversion circuit 7, and a demodulating circuit for demodulating the output of the amplifier 8 and producing a reproduction signal 16. A cylinder type piezo-electric element 2 can have access to any bit row by a driving mechanism such as a linear motor, not shown.

During recording and reproduction, a bias voltage is applied to between the probe 1 and the medium 3 by the variable voltage source 6 and the probe 1 is brought close to the medium 3 to such a degree that a tunnel current or an electric field emission current flows therebetween. This tunnel current or electric field emission current is converted into a voltage by the current voltage conversion circuit 7, whereafter it is input to the control circuit 9 via the amplifier 8. The control circuit 9 outputs a distance control signal 12 so that the tunnel current or the electric field emission current may become constant, and this signal is applied to an electrode 5a for driving the cylinder type piezoelectric element 2 in a direction Z.

As the material of the medium 3, use is made of a glass metal made by the splat quenching method. Specifically, use can be made of Rh—Zr which is a kind of alloy glass. This glass metal has sufficient flatness (0.1 mm rms or less) to be used in the present embodiment, by the physical etching of $Ar^+$ ions or the like. The probe 1 opposed to the medium 3 is provided by electrolyzing and polishing a tungsten wire, and has an end radius R of 0.1 $\mu$m or less.

The recording method will now be described. The formation of the tracking bits 4a is accomplished by applying a voltage of 1.0 V to between the medium 3 and the probe 1 through the variable voltage source 6, and thereafter letting an electric current of 200 nA much greater than 1 nA which is the tunnel current flowing between the medium 3 and the probe 1 flow when a sample is observed usually by means of STM, and again restoring the electric current to 1 nA. That is, by this, the glass metal surface of the medium 3 is melted by Joule heat and is attracted by a strong electrostatic power between the medium 3 and the probe 1, whereby a tracking bit 4a is formed as a small bit. The size of this bit, as estimated by STM observation is 20 nm in diameter and 5 nm in height in a non-recording state (for the ground).

On the other hand, the information bit 4b is formed by likewise modulating the tunnel current from 1 nA to 200 nA with the output of the variable voltage source 6 fixed as 1.5 V, and again restoring it to 1 nA. In this case, the information bit is formed as a bit having a diameter of 30 nm and a height of 10 nm which are greater than those of the tracking bit 4a, by the difference in the electrostatic power acting between the medium 3 and the probe 1 and the energy supplied to the medium. Then, the probe and the medium 3 are moved relative to each other by a driving mechanism, not shown, and the variable voltage source 6 is controlled by the control circuit 9, and as regards the actual recording information, the information bits 4b are sometimes recorded instead of the tracking bits 4a in conformity with a recording signal 14 while the tracking bits 4a are recorded at predetermined intervals. In other words, when for example, a digital signal "0" is to be recorded, a tracking bit 4a is formed, and when a digital signal "1" is to be recorded, an information bit 4b is formed. Thus, bits are formed at equal intervals.

During reproduction, the probe 1 is moved to a desired recording bit row 4 by a driving mechanism, not shown whereafter the recording bit row 4 is scanned by the probe 1, and the variation in the tunnel current caused by the classifications of the bits, i.e., the difference between the tracking bits and the information bits, is detected and reproduction is effected. During the recording of the recording bit rows 4, recording is effected at the positioning accuracy of the apparatus and therefore, the bit rows 4 are recorded in a minutely undulated form. Therefore, during reproduction, control (tracking) is effected in the following manner so that the probe 1 may follow the bit rows 4.

When the probe 1 is on a bit row 4, the signals of different levels of the tracking bit 4a and the information bit 4b are detected as reproduction signals. At this time, the probe 1 is vibrated in a direction orthogonal to the bit row 4 at an amplitude smaller than the width of the tracking bit 4a and at a frequency f (the frequency f is made sufficiently low as compared with the frequency of the reproduction signal of the bit row 4). The amplitude of the reproduction signal of the bit row 4, as shown in FIG. 2A, becomes greatest when the probe 1 scans the center of the bit row 4, and becomes small when the probe 1 scans any portion off the center of the bit row 4. If at that time, the probe 1 is vibrating at the frequency f as indicated by a in the figure, the reproduction signal causes variations in its amplitude as indicated by signals Sb–Sd shown in FIG. 2B in conformity with the scanning positions of the probe 1 on the bit row 4 indicated by arrows b–d. When the envelope signal of this reproduction signal is taken out, there are obtained the waveforms of the signals Sb'–Sd' of FIG. 2B. That is, in contrast with the vibration waveform a of the probe 1, the envelope signal thereof becomes small like the signal Sc' when the probe 1 scans right above the center line of the bit row 4 as indicated by arrow c, and the phase of the envelope signal shifts by 180° and the amplitude thereof becomes great when the probe 1 scans upwardly off the center line as indicated by arrow b, and the envelope signal becomes of the same phase and the amplitude thereof becomes great when the probe 1 scans downwardly off the center line as indicated by arrow d. Therefore, when phase detection is effected with the standard signal a of the frequency f of the probe 1 as a reference signal, there is obtained a signal proportional to the amount of deviation from the bit row 4 (a feedback signal), and feedback control for keeping the probe 1 on the bit row 4 by the use of that signal becomes possible.

That is, the control circuit 9 shown in FIG. 1 has therein a generator for the standard signal a, and generates a sine wave of a frequency f by the generator. This signal is amplified and superposed on a two-dimensional scanning signal 10, whereby the cylinder type piezoelectric element 2 is minutely vibrated. On the other hand, on the basis of the reproduced tunnel current signal and the standard signal a, the control circuit 9 outputs a tracking control signal 11 which is a feedback signal by the above-described technique, and the probe 1 is kept on the bit row 4. When reproduction is effected with the probe 1 following the bit row 4 in this manner, there are obtained tunnel current signals of different levels conforming to the heights of the tracking bit 4a and the information bit 4b, respectively, and therefore, on the basis of these signals, a reproduction signal 16 can be obtained through the demodulating circuit 15 such as a binarizing circuit.

The tunnel current signal assumes a tunnel current value differing from the surrounding non-recording portion even when the probe passes a tracking bit corresponding, for example, to "0" information. Also, the bits are formed intermittently. Therefore, the bit forming portion can be easily discriminated as a bit. Accordingly, even if the tracking bits are continuous, the number of bits of the "0" information can be easily discriminated.

In the present embodiment, a glass metal is used as the material of the recording medium 3, but instead of it, use may be made of a material which has electrical conductivity and whose surface shape is varied by the modulation of the tunnel current. Also, tracking bits and information bits may be formed by modulating the tunnel current in an atmosphere of organic metal gas to thereby pile metal films of different sizes.

Figure 3:
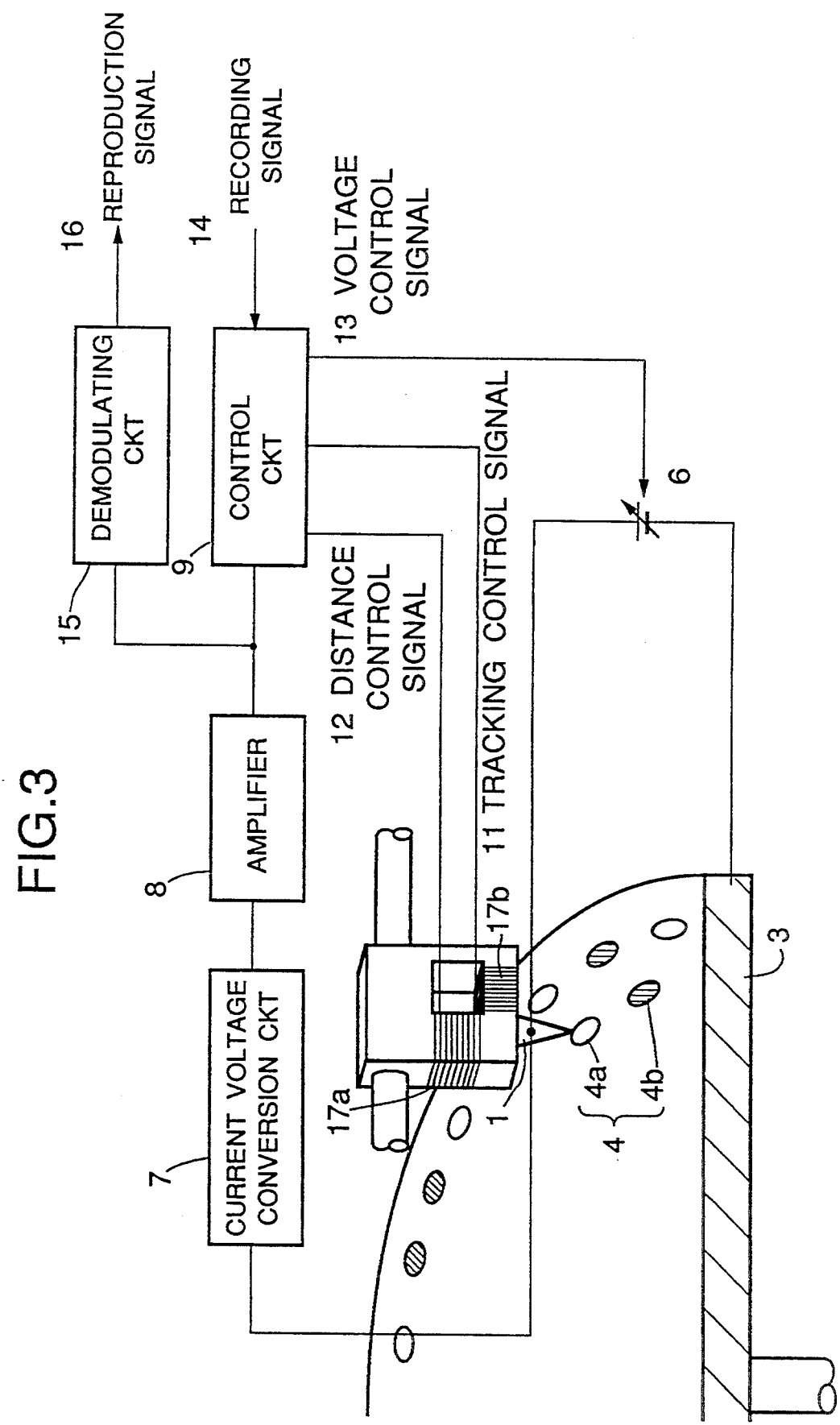
FIG. 3 is a block diagram showing the construction of a second embodiment of the information recording-reproducing apparatus according to the present invention.

FIG. 3 shows a second embodiment of the present invention.

This embodiment is a recording-reproducing apparatus using as a recording medium a material having two or more kinds of memory effects for the current-voltage switching characteristic. As the recording medium 3, use can be made, for example, of two layers of monomolecular film formed on the epitaxial growth surface of gold by Langmuir-Blodgett's technique by the use of squalirium-bis-6-octylazulene (hereinafter referred to as SOAZ). This recording medium 3 is rotated at a constant angular velocity or at a constant linear velocity by driving means such as a motor, not shown. The probe 1 has its distance to the medium 3 adjusted by a piezo-electric element 17a, and has its fine adjustment in a direction perpendicular to the tracking direction effected by a piezo-electric element 17b. During recording and reproduction, a bias voltage on the order of 0.1-1 V is applied to between the probe 1 and the recording medium 3 by the variable voltage source 6, and the control circuit 9 outputs a distance control signal 12 so that the tunnel current flowing between the probe and the medium may become constant (1 pA), and controls the distance adjusting piezo-electric element 17a. As the probe 1, use is made of platinum mechanically cut and pointed.

In this construction, when the output of the variable voltage source 6 is modulated and a pulse voltage of 6 V is applied to between the probe 1 and the medium 3, there is formed a bit of size 10 nm$\phi$ through which an electric current of 10 pA flows, and after the application of the pulse voltage, that state is maintained (the initial state). When in that state, a voltage of $-8$ V and a voltage of $+1.5$ V are further applied in a pulse-like fashion, there is created an ON state in which an electric current of 100 nA flows. This ON state is also maintained like the initial state, and is restored to the initial state by a pulse voltage of 5 V being further applied. So, a voltage source control signal 13 is output from the control circuit 9 to the variable voltage source 6 so that a pulse voltage indicative of the initial state may be applied from the control circuit 9 to between the probe 1 and the recording medium 3, to thereby form the above-described bit, which is recorded as a tracking bit 4a. On the other hand, a pulse voltage indicative of the ON state is applied in conformity with a variation in a recording signal 14 to thereby form a bit, which is recorded as an information bit 4b. In this manner, there are formed recording bits rows 4 comprising tracking bits 4a and information bits 4b arranged in the form of a concentric circles or a spiral form as shown in FIG. 3.

During reproduction, as in the above-described embodiment, a voltage of 1 V which will not create an electrical memory effect is applied to between the medium 3 and the probe 1, and the probe 1 is moved to a desired recording bit 4, whereafter a variation in the tunnel current flowing therebetween, i.e., a variation in resistance value, is detected. At this time, control is effected so that the probe 1 may follow the bit row 4 as in the aforedescribed embodiment. That is, the probe 1 is vibrated in a direction orthogonal to the bit row 4 at an amplitude smaller than the width of the recording bit row 4, and the control circuit 9 outputs a tracking control signal 11 to the tracking piezo-electric element 17b and controls it so that the probe 1 may be kept on the bit row 4 in the same manner as in the aforedescribed embodiment. When reproduction is effected with the probe 1 following the bit row 4 in this manner, there are obtained signals of different levels corresponding to the tracking bit 4a and the information bit 4b through the current-voltage conversion circuit 7 and the amplifier 8. These signals are demodulated by the demodulating circuit 15 such as a binarizing circuit as in the aforedescribed embodiment, whereby there can be obtained a reproduction signal 16. That is, demodulation is effected from the difference between the resistance values of the bits by means such as a binarizing circuit.

Figure 4B:
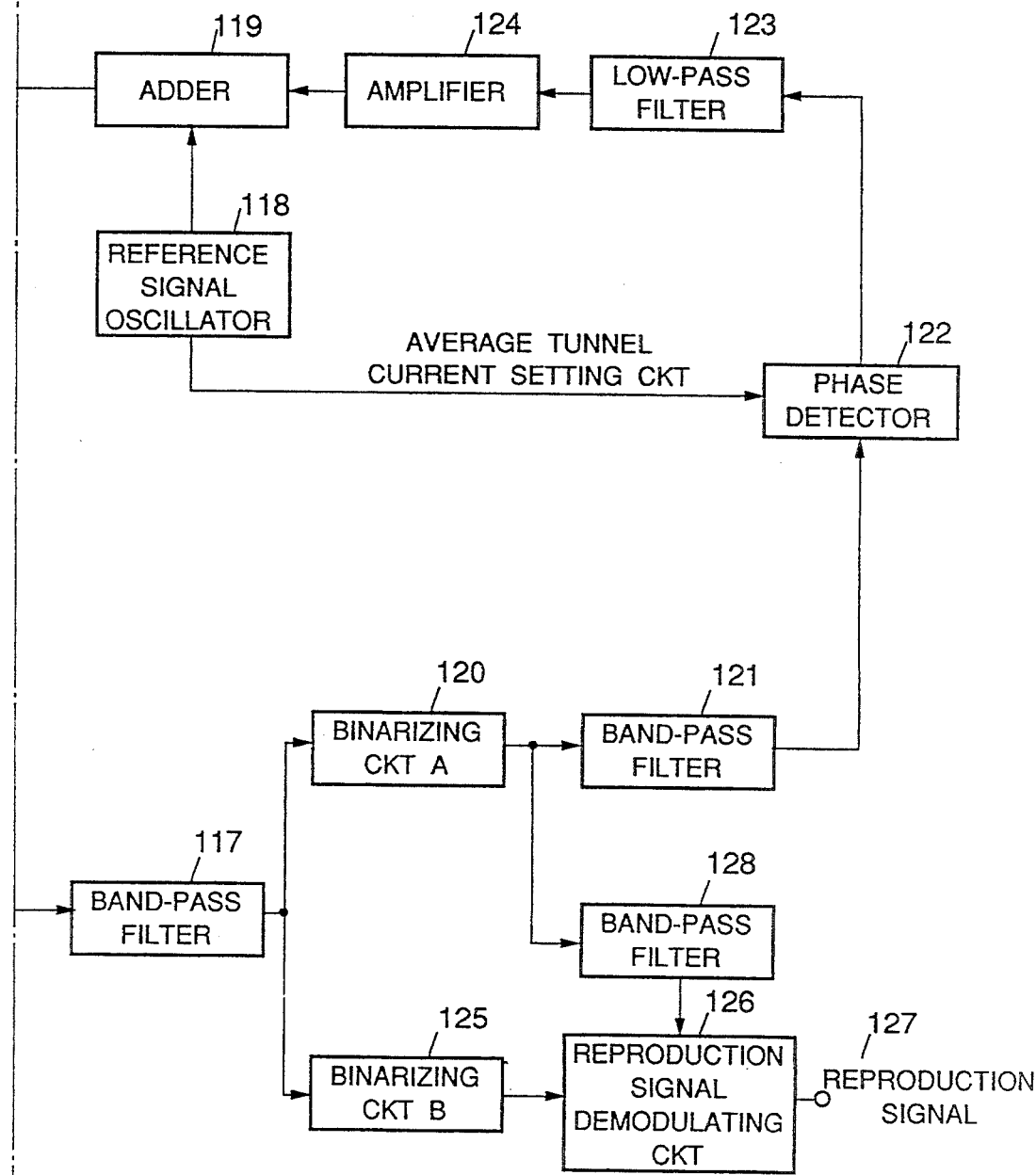
Figure 6:
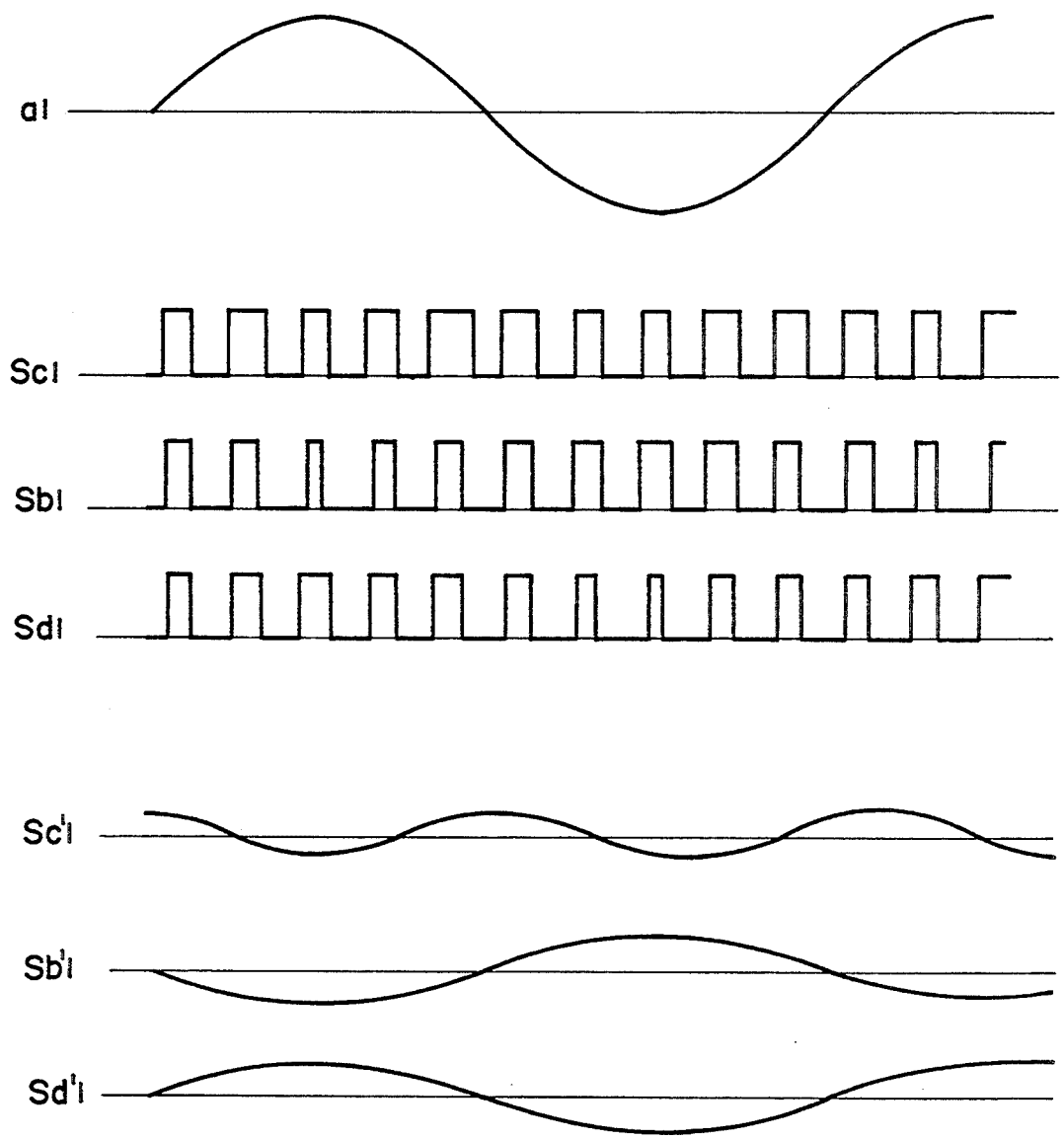
FIGS. 6 and 7 illustrate signal waveforms in the apparatus of FIG. 4.
Figure 8:
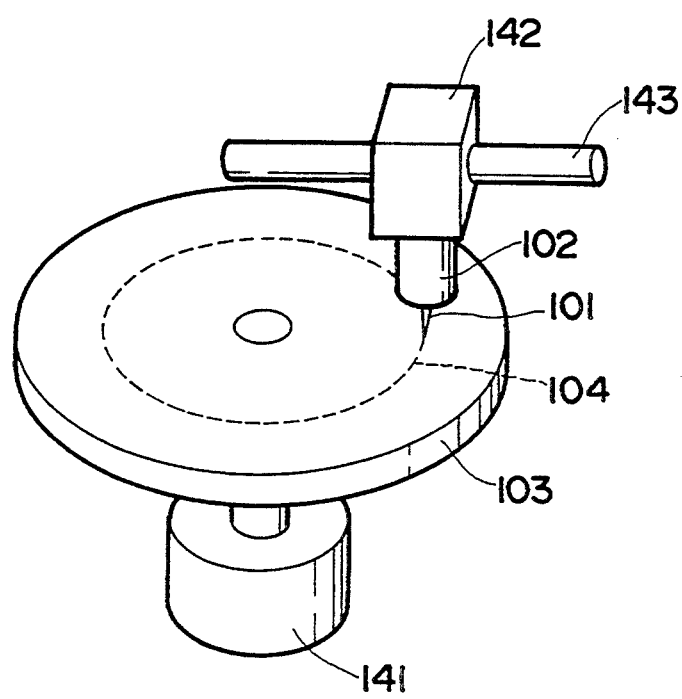
FIG. 8 is a schematic pictorial view of the apparatus of FIG. 4.

FIG. 4 is a block diagram showing the construction of a recording-reproducing apparatus according to a third embodiment of the present invention, FIG. 5 shows the positional relation between the probe and a data rows and the intensity of a modulation component of minute vibration included in the then detection signal, FIG. 6 illustrates the then tunnel current detection single, and FIG. 8 is an illustration of a recording-reproducing apparatus using a disk-like recording medium.

The construction will hereinafter be schematically described with reference to FIG. 8. The reference numeral 101 designates a probe, the reference numeral 102 denotes a cylinder type piezo-electric element for driving the probe 101, the reference numeral 103 designates a recording medium, and the reference numeral 104 denotes data rows recorded on the recording medium.

The recording medium 103 is of a disk-like shape and is rotated at a constant angular velocity or at a constant linear velocity by a motor 141. The data rows 104 may be recorded in a spiral form or in the form of concentric circles, and the probe 101 is fixed to a head unit 142 with the cylinder type piezo-electric element 102, and is linearly driven radially of the recording medium 103 along a guide shaft 143 by a driving mechanism such as a linear motor, not shown, and can have access to any data row to thereby effect the recording or reproduction of data. At that time, the access to a desired data row is effected by a position detector such as a linear encoder, not shown. Thereafter, the probe 101 is controlled so as to follow the desired data row.

The recording-reproducing method will be described with reference to FIG. 4. A bias voltage is applied to between the probe 101 and the recording medium 103 by a bias voltage source 106. A tunnel current flowing between the probe 101 and the medium 103 at this time is converted into a voltage signal by a current-voltage conversion circuit 107, whereafter it is logarithmically transformed by a logarithmic transformation circuit 108 so that the intensity of the signal may be proportional to the distance between the probe and the recording medium. By the use of this output signal, control is effected so that the average distance may become constant when the probe 101 and the recording medium 103 are moved relative to each other. That is, the output signal of the logarithmic transformation circuit 108 is input to an average tunnel current setting circuit 109 and a difference signal (an error signal) with respect to a set value which provides a desired interval is detected, and that signal is applied to an electrode 113 through a low-pass filter 110 passing therethrough a frequency sufficiently smaller than the data bit detection frequency and an amplifier 111, and controls the cylinder type piezo-electric element in a direction Z. Thereby, the cylinder type piezo-electric element drives the probe in the direction Z to negate the deviation from the desired interval.

During recording, a signal is sent from a recording control circuit 115 to a pulse application circuit 116 in conformity with a recording signal 114. The pulse voltage of this pulse application circuit 116 is added to a bias voltage by an adder 105, and is applied to between the recording medium 103 and the probe 101, whereby recording is effected.

During reproduction, the probe 101 is moved onto a desired data row, and the probe 101 detects a variation in the information bit portion and tracking bit portion, which will be described later, of the tunnel current between the probe and the surface of the recording medium 103, thereby effecting reproduction.

As the recording medium 103, use is made of a glass metal made by a method using the splat quenching technique. Specifically, use is made of Rh—Zr which is a kind of alloy glass. The glass metal has sufficient flatness (0.1 nm rms or less) to be used in the present embodiment, by physical etching of $Ar^+$ ions or the like. The probe 101 opposed to the recording medium 103 is one provided by electrolyzing and polishing tungsten and having an end radius R of 0.1 μm or less.

The recording method will now be described. Recording is accomplished by the formation of information bits and tracking bits. The formation of tracking bits 100a is accomplished by applying a voltage of 1.0 V to between the recording medium 103 and the probe 101 through the bias power supply 106, and thereafter letting an electric current of 200 nA much greater than 1 nA (which is a tunnel current usually flowing between the recording medium 103 and the probe 101 when a sample is observed by means of STM) flow, and then restoring it to 1 nA again. Thereby, the surface of the glass metal is melted by Joule heat and is attracted by strong electrostatic power between the recording medium 103 and the probe 101 to form a small bit. The size of the bit as then estimated by means of STM was 20 nm in diameter and 5 nm in height.

On the other hand, the information bit 100b is formed by applying a voltage of 1.5 V to between the recording medium 103 and the probe 101, and thereafter modulating the tunnel current from 1 nA to 200 nA, and restoring it to 1 nA again. In this case, by the difference between the electrostatic power acting between the recording medium 103 and the probe 101 and the supplied energy, the information bit is formed as a bit having a diameter of 30 nm and a height of 10 nm greater than those of the tracking bit. The actual recording is effected by recording the information bits 100b instead of the tracking bits in conformity with a recording signal 114 while recording the tracking bits 100a at predetermined intervals. In other words, when a digital signal "0" is to be recorded, a tracking bit is formed, and when a digital signal "1" is to be recorded, an information bits is formed.

The reproducing method will now be described.

During reproduction, the probe 101 is moved to a desired bit row 104, whereafter the bit row 104 is scanned by the probe 101, and a variation in the tunnel current caused by the classifications of the bits, i.e., the difference between the information bits and the tracking bits, is detected to thereby accomplish reproduction. Since the recording of the bit row 104 is only positioned by the position detector of a moving mechanism, the data row is minutely undulatedly recorded by the temperature drift of the apparatus and the vibration from the outside. Also, reproduction is likewise affected and the probe 101 cannot trace the data row 104 by only the positioning by the position detector of the moving mechanism and thus, the S/N ratio of data reproduction tends to be come worse. So, in the present invention, control is effected in the following manner so that reproduction can be accomplished while the probe 101 follows a desired data row 104 when the probe is moved to that data row 104 by the moving mechanism.

When the probe 101 is being positioned on the data row 104, reproduction signals from the tracking bits 100a and the information bits 100b come to be superposed on the tunnel current, and from the output of the logarithmic transformation circuit 108, only the reproduction signal frequency thereof is taken out by a band-pass filter 117. At that time, the probe 101 is steadily vibrated as shown in FIG. 5 at an amplitude smaller than the width of the data row 104 and at a frequency f in a direction orthogonal to the data row 104. (The frequency f is made sufficiently small as compared with the frequency of the reproduction signal of the data row 104.) The amplitude of the reproduction signal of the data row varies in conformity with the deviation of the position of the scanning line (the scanning position) of the probe 101 with respect to the data row 104. That is, the amplitude intensity of the modulation signal, as shown in the graph of FIG. 5, becomes greatest when the probe scans the center of the data row, and becomes small when the probe scans off the data row. If at that time, the probe 101 is minutely vibrating at the frequency f as indicated by $a_1$ in FIG. 6, the output of the binarizing circuit A to which the output of the band-pass filter 117 has been input varies as shown by the signals $Sb_1$, $Sc_1$ and $Sd_1$ of FIG. 6, depending on the positions of arrows $b_1$–$d_1$ indicated in FIG. 5. That is, the signal from the data row has its pulse width modulated in conformity with the amount of deviation from the track. When this signal is taken out through a band-pass filter (BPF) 121, it is as shown by $Sb_1'$, $Sc_1'$ and $Sd_1'$ in FIG. 6. That is, in contrast with the vibration waveform $a_1$ of the probe 101, the signal becomes small in amplitude as shown by the signal $Sc_1'$ when the probe 101 scans right above the center line of the data row as indicated by arrow $c_1$, and in contrast with the vibration waveform $a_1$ of the probe, the signal is 180° out of phase and becomes small in amplitude when the probe scans upwardly off said center line as indicated by arrow $b_1$, and in contrast with the vibration waveform $a_1$ of the probe, the signal is of the same phase and becomes great in amplitude when the probe scans downwardly off said center line. Therefore, when phase detection is effected by the output from the BPF 121 with the standard signal of the frequency f of the probe 101 as a reference signal, there is obtained a signal proportional to the amount of deviation from the data row, and feedback control for keeping the probe 101 on the data row by the use of that signal becomes possible.

This will hereinafter be described in detail with reference to FIG. 4.

In FIG. 4, a sine wave of a frequency f generated by a reference signal oscillator 118 is applied to the electrode 112 of the cylinder type piezo-electric element 102 via an adder 119, whereby the probe 101 is steadily minutely vibrated in a direction orthogonal to the data row. On the other hand, the output of a band-pass filter 117 which is a reproduction signal from the data row is input to the binarizing circuit A 120 for taking out tracking information and the band-pass filter 121. This output is input to a phase detection circuit 122 and the aforedescribed phase detection of the reference signal from the reference signal oscillator 118 and the frequency f is effected. The result of the output thereof is smoothed by a low-pass filter 123 and is input as a positional deviation detection signal to the electrode 112 of the cylinder type piezo-electric element 102 via an amplifier 124 by the adder 119, together with a driving signal which causes the aforementioned vibration of the frequency f, whereby the probe 101 is controlled so as not to deviate from the data row. Thus, tracking control is effected. A part of the output of the binarizing circuit A 120 is input to a band-pass filter 128 and used for the formation of a reference clock signal which will be described later.

Figure 7:
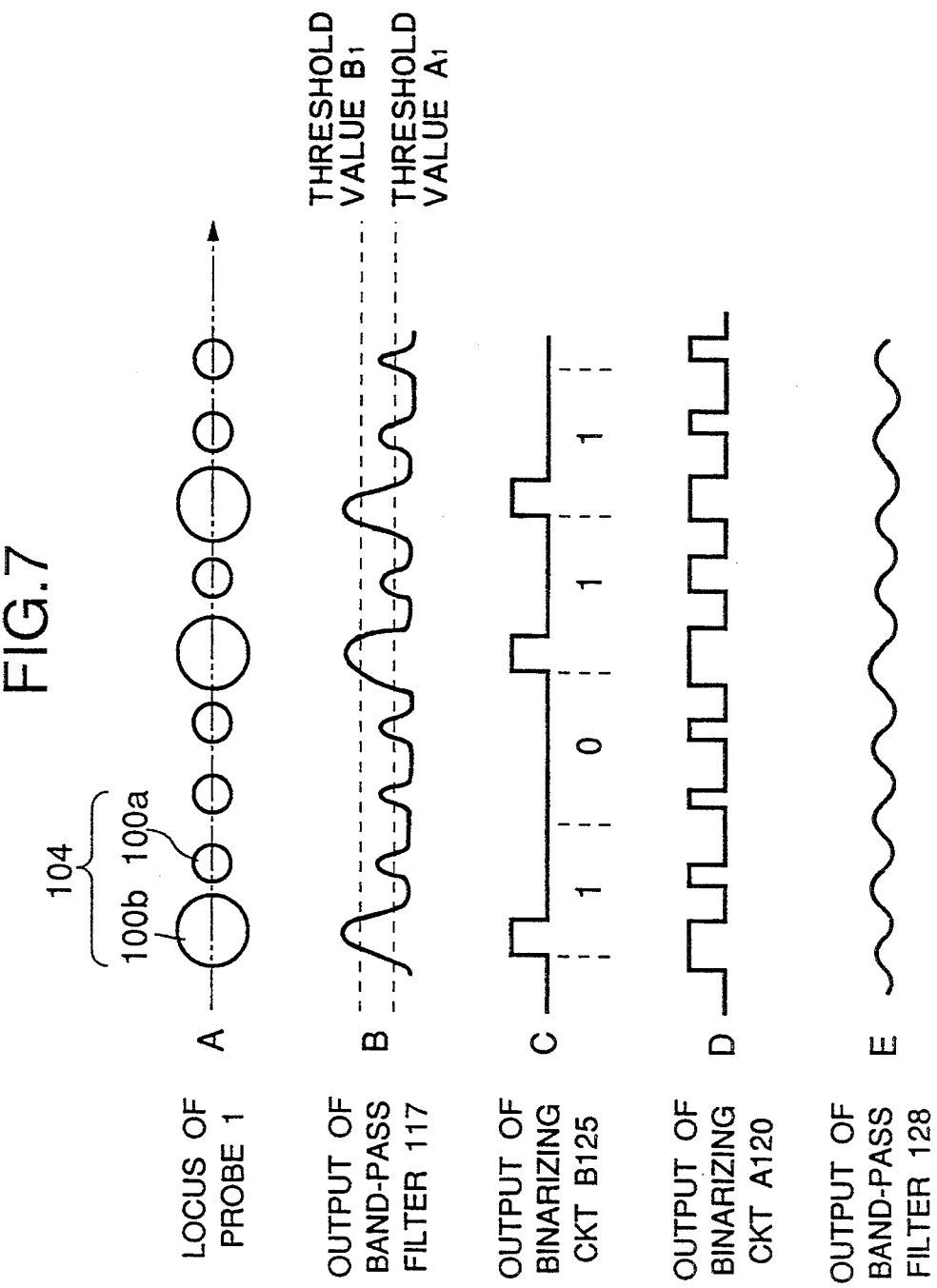

Reproduction of the signal is effected while such position control of the probe is effected, and this reproduction will now be described with reference to FIG. 7.

When the probe 101 is position-controlled on the data row as shown in FIG. 7A, tunnel current signals of different levels conforming to the tracking bit 100a and the information bit 100b are obtained from the band-pass filter 117 (FIG. 7B). At this time, the output is binarized by a threshold value $A_1$ (the slice level of the binarizing circuit A 120, and as shown in FIG. 7D, a binarized signal based on the signals from both of the tracking bit and the information bit is obtained, and the position control as described previously is effected by this obtained signal. Also, the output of the band-pass filter 117 is binarized by a threshold value $B_1$ (the slice level of a binarizing circuit B 125), and a signal from only the information bit as shown in FIG. 7C is separated. So, the signal from this information bit is input to a reproduction signal demodulating circuit 126 which operates with the output of the band-pass filter 128 (FIG. 7E) as a reference clock, whereby a reproduction signal 127 is obtained. That is, the presence or absence of the signal from the information bit during the production of each clock signal is discriminated on the basis of this reference clock, and for example, digital signals "1" and "0" are discriminated therebetween, whereby a reproduction signal is finally obtained. Since in this manner, the presence or absence of the information bit is discriminated by the timing of the reference clock signal obtained from both of the tracking bit and the information bit, the reproduction signal demodulating circuit can reliably discriminate the presence or absence of the information bit at a position whereat there is a bit (an information bit or a tracking bit), and even if a state in which there is no information bit (that is, there are tracking bits) continues, there is no erroneous discrimination of the number of bits.

In the above-described embodiments, the probe is minutely vibrated on the data row to position-control it on the medium, but this affects little the discrimination of the presence or absence of the information bit because the information bit formed is large, and irrespective of the position of the probe on the data row, a signal of a high S/N ratio is obtained from the information bit.

In the third embodiment, a binarizing circuit having a predetermined slice level is used for the separation of the information bits and the tracking bits. However, the present invention is not restricted to such method, but attention may be turned to the detection pulse width of the tunnel current signal. That is, there may be provided a discrimination circuit using the pulse width of the tunnel current, and the information bit component and the tracking bit component may be separated from each other by this circuit. Thus, the difference in size between the information bit and the tracking bit can be detected to thereby discriminate between the bits and effect the reproduction of information.

Also, in the above-described embodiments, the recording medium is of a disk-like shape, but similar control can be accomplished even if the recording medium is of a card-like shape or a tape-like shape.

Further, in the above-described embodiments, the probe is minutely vibrated, but alternatively, a driving element may be provided so as to minutely vibrate the recording medium. Furthermore, the driving means for the probe need not be limited to the cylinder type piezo-electric element, but other driving element such as a bimorph piezo-electric element can be used.

Also, in the third embodiment, the recording medium used is a medium in which the amount of modulation of the surface varies for a variation in the tunnel current on the bias voltage, but alternatively, use may be made of a medium having three or more electrically stable states for a variation in the tunnel current or the bias voltage used in the second embodiment, for example, organic monomolecular film comprising molecules which have a $\pi$ electron conjugate system laminated on an electrode, or cumulated film thereof. Where such a medium is used, a suitable difference in recording area between the information bit and the tracking bit is taken and yet the difference between signal levels can be secured greatly and therefore, tracking suffering little from malfunctioning and reproduction of still higher S/N ratio become possible.

The variations in the state of bits are not limited to two kinds, but may also be three or more kinds. That is, for example, three or more kinds of bits differing in size may be formed as bits and recording and reproduction may be effected.

What is claimed is:

1. A method of recording multi-level information on a recording medium, said method comprising the steps of:

scanning over the recording medium using a probe capable of recording multi-level information, said scanning being performed along a surface of the recording medium, the recording medium being adapted assume two or more kinds of changes in at least one of a topographical state and an electrical characteristic state different from that of a non-recorded portion of the recording medium; and forming any one of the two or more kinds of state changes selected in accordance with a respective level of the multi-level information so as to form on the recording medium separate bits each of which correspond to the respective level of the multi-level information while performing said scanning step, wherein each of the topographical states or electrical characteristic states of the bits formed on the recording medium is different from that of the non-recorded portion state as the topographical state or electrical characteristic state of the non-recorded portion exists between the bits.

2. A method according to claim 1, wherein said step of forming anyone of the two or more kinds of state changes is performed by applying a predetermined voltage between the probe and the recording medium.

3. A method according to claim 2, wherein said step of forming anyone of the two or more kinds of state changes is performed so that the two or more kinds of changes in at least one of the topographical state and the electrical characteristic state are variably formed on the recording medium by varying at least one of a value of current flowing and a value of voltage applied between the probe and the recording medium.

4. A method according to claim 1, wherein said step of forming anyone of the two or more kinds of state changes is performed by causing a topographical state change in the recording medium.

5. A method according to claim 4, wherein the two or more kinds of state changes in the recording medium are caused by forming two or more kinds of concave or convex portions differing in height or size.

6. A method according to claim 1, wherein said step of forming anyone of the two or more kinds of state changes is performed such that the state changes are formed on the recording medium by causing the recording medium to assume variations in its electrical resistance characteristics.

7. A method according to claim 6, wherein said step of forming anyone of the two or more kinds of state changes is performed such that the two or more kinds of state changes are caused by forming two or more kinds of changes in the electrical resistance characteristics of the recording medium.

8. A method according to claim 1, wherein said step of forming anyone of the two or more kinds of state changes is performed so as to cause any one of the two or more kinds of changes in at least one of the topographical state and the electrical characteristic state on the recording medium at substantially equal intervals.

9. A method of reproducing multi-level information from a recording medium, said method comprising the steps of:

scanning over the recording medium using a probe capable of reproducing multi-level information, said scanning being performed along the surface of the recording medium on which bits are separately formed in a predetermined direction, each of the bits corresponding to a respective level of the multi-level information, each of the bits being formed by causing the recording medium to assume one of two or more kinds of changes in at least one of a topographical state and an electrical characteristic state different from that of a non-recorded portion of the recording medium, selected in accordance with the respective level of the multi-level information to be recorded, a region assuming the same state as the topographical state or electrical characteristic state of the non-recorded portion existing between the bits; and reproducing multi-level information from the recording medium while performing said scanning step, wherein a difference between the changes in at least one of the topographical and the electrical characteristic states for each bit is detected to perform reproduction of the multi-level information.

10. A method according to claim 9, wherein the reproduction of multi-level information is performed by detecting an electric current flowing between the probe and the recording medium.

11. A method according to claim 9, wherein a difference between heights or sizes of two or more concave or convex portions of the recording medium differing in height or size, which were formed on the recording medium as the two or more kinds of state changes in the topographical state, is detected to perform the reproduction of multi-level information.

12. A method according to claim 9, wherein a difference between the electrical resistance characteristics of two or more portions of the recording medium differing in electrical resistance characteristics, formed in the recording medium as the two or more kinds of changes in the electrical characteristic state, is detected to perform the reproduction of multi-level information.

13. A method according to claim 9, further comprising a step for detecting a deviation of the probe from the bits formed in the predetermined direction upon scanning by the probe.

14. A method according to claim 13, wherein said step of detecting the deviation of the probe from the bits is performed on the basis of a detection signal output by the probe scanning the recording medium indicating the bits.

15. A method according to claim 13, further comprising a step for performing a tracking operation such that the probe follows the arrangement of the bits on the basis of the result of said step of detecting the deviation of the probe from the bits.

16. An information recording medium from which multi-level information is reproduced by scanning said recording medium with a probe positioned opposite thereto, said recording medium comprising:

a substrate; and a recording surface on which bits are separately formed in a predetermined direction, each of the bits corresponding to a respective level of the multi-level information, each of the bits being formed with one of two or more kinds of changes in at least one of a topographical state and an electrical characteristic state different from that of a non-recorded portion of said recording medium, selected according to the respective level of the multi-level information to be recorded, wherein a region assuming a same state as the topographical state or electrical characteristic state of the non-recorded portion exists between the bits.

17. A medium according to claim 16, wherein the two or more kinds of changes in the topographical state are caused by forming on said recording medium two or more kinds of concave or convex portions differing in height or size.

18. A medium according to claim 16, wherein the two or more kinds of changes in the electrical characteristic state are caused by forming on said recording medium two or more kinds of portions differing in electrical resistance characteristics.

19. An apparatus for recording multi-level information on a recording medium which is adapted to assume two or more kinds of changes in at least one of a topographical state and an electrical characteristic state different from that of a non-recorded portion of the recording medium, said apparatus comprising:

a probe through which recording of multi-level information is performed on the recording medium;

scanning means for causing said probe to scan the recording medium; and multi-level information recording means for performing recording of multi-level information through said probe which is caused to scan the recording medium by said scanning means, said multi-level information recording means separately forming bits on the recording medium to thereby perform the recording of multi-level information, each of the bits corresponding to a respective level of the multi-level information, each of the bits being formed by causing the recording medium to assume any one of the two or more kinds of changes in at least one of the topographical state and the electrical characteristic state, selected according to the multi-level information to be recorded, wherein a region assuming a same state as the topographical state or electrical characteristic state of the non-recorded portion exists between the bits.

20. An apparatus according to claim 19, wherein said multi-level information recording means performs recording of multi-level information by applying a predetermined voltage between said probe and the recording medium.

21. An apparatus according to claim 19, wherein said multi-level information recording means forms bits such that the two or more kinds of changes in at least one of the topographical state and the electrical characteristic state are variably formed on the recording medium by changing at least one of a value of a current flowing and a voltage applied between said probe and the recording medium.

22. An apparatus according to claim 19, wherein said multi-level information recording means performs recording of multi-level information by forming bits of information by causing the two or more kinds of changes in topographical state on the recording medium.

23. An apparatus according to claim 22, wherein the two or more kinds of changes in the topographical state are caused by forming on the recording medium two or more kinds of concave or convex portions differing in height or size.

24. An apparatus according to claim 19, wherein said multi-level information recording means performs recording of multi-level information so that the two or more kinds of changes in the electrical characteristic state of the recording medium are caused by varying electrical resistance characteristics of the recording medium.

25. An apparatus according to claim 24, wherein said multi-level information recording means performs recording of multi-level information so that the two or more kinds of changes in the electrical characteristic state of the recording medium are caused by forming two or more kinds of portions differing in the electrical resistance characteristics.

26. An apparatus according to claim 19, wherein said multi-level information recording means performs recording of multi-level information to cause the recording medium to assume any one of the two or more kinds of changes in at least one of the topographical state and the electrical characteristic state, at substantially equal intervals.

27. An apparatus for reproducing multi-level information from a recording medium, said apparatus comprising:

a probe through which reproduction of multi-level information is performed for reproducing multi-level information recorded on the recording medium, the recording medium having bits separately formed along a predetermined direction, by causing the recording medium to assume two or more kinds of changes in at least one of a topographical state and an electrical characteristic state different from that of a non-recorded portion of the recording medium, each of the bits corresponding to a respective level of the multi-level information, each of the bits being formed by causing the recording medium to assume any one of the two or more kinds of changes, selected in accordance with the multi-level information to be recorded, wherein a region assuming a same state as the topographical state or electrical characteristic state of the non-recorded portion exists between the bits;

scanning means for causing said probe to scan the recording medium along the predetermined direction; and multi-level information reproducing means for performing reproduction of multi-level information through the probe scanning by said scanning means, wherein a difference between the state changes on the recording medium is detected to perform the reproduction of multi-level information.

28. An apparatus according to claim 27, wherein said multi-level information reproducing means performs reproduction of multi-level information by detecting current flowing between said probe and the recording medium.

29. An apparatus according to claim 27, wherein a difference between heights or sizes of two or more kinds of concave or convex portions of the medium differing in height or size, and formed on the recording medium as the two or more kinds of changes in topographical state, is detected to perform reproduction of multi-level information by said multi-level information reproducing means.

30. An apparatus according to claim 27, wherein a difference between electrical resistance characteristics of two or more kinds of portions differing in electrical resistance state, and formed on the recording medium as the two or more kinds of changes in electrical state, is detected to perform reproduction of multi-level information by said multi-level information reproducing means.

31. An apparatus according to claim 27, further comprising means for detecting upon scanning by said probe, a deviation of said probe from the bits formed along the predetermined direction.

32. An apparatus according to claim 31, wherein said deviation detecting means performs the detection of deviation on the basis of a detection signal from said probe indicating the bits.

33. An apparatus according to claim 31, further comprising means for performing a tracking operation on the basis of the detected deviation result so that said probe is caused to follow an arrangement of the bits during scanning by said probe.

34. An apparatus according to claim 27, wherein said information reproducing means includes a clock signal generating means for generating a clock signal for discriminating the bits to perform information reproduction.

35. An apparatus according to claim 34, wherein said clock signal generating means generates the clock signal from a detection signal of the bits received from said probe.

* * * * *

UNITED STATES PATENT AND TRADEMARK OFFICE
CERTIFICATE OF CORRECTION

PATENT NO.   : 5,446,720
DATED        : August 29, 1995
INVENTOR(S)  : Takahiro Oguchi, et al.

It is certified that error appears in the above-identified patent and that said Letters Patent is hereby corrected as shown below:

ON TITLE PAGE

In [56] References Cited, under U.S. PATENT DOCUMENTS:
"Setami" should read --Setani--.

COLUMN 3

Line 58, "shown" should read --shown,--.

COLUMN 5

Line 53, "bits" should read --bit--.

COLUMN 6

Line 21, "single," should read --signal,--.

COLUMN 8

Line 3, "be come" should read --become--.

COLUMN 10

Line 11, ".limited" should read --limited--.
Line 43, "adapted" should read --adapted to--.

UNITED STATES PATENT AND TRADEMARK OFFICE
CERTIFICATE OF CORRECTION

PATENT NO. : 5,446,720

DATED : August 29, 1995

INVENTOR(S) : Takahiro Oguchi, et al.

Page 2 of 2

It is certified that error appears in the above-identified patent and that said Letters Patent is hereby corrected as shown below:

COLUMN 10

Line 57, "portion state" should read --portion of the recording medium and a region assuming the same state--.

Signed and Sealed this

Second Day of January, 1996

Attest:

BRUCE LEHMAN

Attesting Officer

Commissioner of Patents and Trademarks